(12) United States Patent
Debus et al.

(10) Patent No.: US 7,096,920 B2
(45) Date of Patent: Aug. 29, 2006

(54) METHOD FOR MANUFACTURING A BRAKE DISK AND CORE MOULDING TOOL

(75) Inventors: Björn Debus, Kirchhain (DE); Reiner Becker, Rabenau (DE)

(73) Assignee: Fritz Winter Eisengiesserei GmbH & Co. KG, Stadtallendorf (DE)

( * ) Notice: Subject to any disclaimer, the term of this patent is extended or adjusted under 35 U.S.C. 154(b) by 36 days.

(21) Appl. No.: 10/450,306

(22) PCT Filed: Dec. 5, 2001

(86) PCT No.: PCT/EP01/14218

§ 371 (c)(1), (2), (4) Date: Sep. 23, 2003

(87) PCT Pub. No.: WO02/46638

PCT Pub. Date: Jun. 13, 2002

(65) Prior Publication Data

US 2004/0040803 A1    Mar. 4, 2004

(30) Foreign Application Priority Data

Dec. 5, 2000    (DE)   ................................ 100 60 262

(51) Int. Cl.
*B22D 19/16*    (2006.01)
(52) U.S. Cl. ........................................ 164/98; 164/112
(58) Field of Classification Search .......... 164/98–112, 164/332–334
See application file for complete search history.

(56) References Cited

FOREIGN PATENT DOCUMENTS

| DE | 199 31 140 A | 2/2000 |
| EP | 0 077 137 A | 4/1983 |
| EP | 0 143 264 A | 6/1985 |

*Primary Examiner*—Kuang Y. Lin
(74) *Attorney, Agent, or Firm*—Proskauer Rose LLP

(57) ABSTRACT

The invention relates to a method for producing a brake disk (B) that comprises a supporting part (2) and a friction ring (R). The inventive method involves the following working steps: manufacturing, especially by casting, the supporting part (2) with at least one radially protruding projection (10) situated on the periphery of the supporting part; forming a cast core (14), which is made of core sand and which surrounds the projection (10) over a foot section (10a) that is assigned to the supporting part (2), onto the supporting part (2) while sealing a free end section (10b) of the projection (10) so that this end section (10b) is not made wet by the sand of the cast core (14); casting the friction ring (R) onto the supporting part (2), which is provided with the cast core (14), while casting around the free end section (10b) of the projection (10). The inventive method enables the production of brake disks, which are additionally optimized with regard to their function, with a supporting part and friction ring that are cast at different times. The invention also relates to a core forming tool, which is particularly suited for carrying out the inventive method.

10 Claims, 5 Drawing Sheets

METHOD FOR MANUFACTURING A BRAKE DISK AND CORE MOULDING TOOL

BACKGROUND OF THE INVENTION

The invention pertains to a method for manufacturing a brake disk with of a carrier part and a friction ring, as well as to a core moulding tool that is used during the course of the manufacture of such a brake disk. In brake disks of the discussed type, on the one hand the carrier part serves for mounting the friction ring. On the other hand the wheel hub of a vehicle wheel is also mounted on the carrier part. For this purpose the carrier part can be realized in a pot-shaped fashion such that the hub of the wheel can be directly mounted on its end face and the brake disk can be pushed onto a bearing on the motor vehicle axle. However, the carrier part may itself also form the hub, in which the respective wheel bearing is arranged. In this case, the wheel of the motor vehicle is usually connected to the carrier part by means of an intermediate flange.

Brake disks are subjected to high mechanical and thermal stresses in practical applications. This applies, in particular, to instances in which heavy utility vehicles need to be decelerated from high speeds. In this case, the predominant portion of the initial kinetic vehicle energy is converted into heat that is dissipated via the brake disk. An excessive heating of the friction ring may lead to stress cracks, in particular, in utility vehicles.

In order to counteract the risk of the formation of stress cracks as a result of overheating, the use of brake disk having only one positive connection between the carrier part and the friction ring has been proposed. Due to this measure, the disk is essentially able to expand radially in an essentially unobstructed fashion when heated. The formation of stress cracks can be effectively prevented in this fashion. In addition, the heat transfer from the friction ring to the carrier part and consequently to the wheel bearing is impaired such that their thermal stress is also reduced. However, the manufacture of such brake disks is problematic.

A method for manufacturing a brake disk with a cast friction ring and a cast pot is known from DE 199 31 140 A1. In this known method, the pot is cast into a previously cast friction ring, in the inner circumferential surfaces of which pocket-like recesses are arranged. The material of the pot penetrates into and fills out these pockets such that a reliable positive connection between the pot and the friction ring is ensured. Another example for casting a pot into a prefabricated friction ring is described in EP 0 933 551 A1.

Another possibility method for manufacturing brake disks with a carrier part and a friction ring that are positively connected to one another by means of a casting process is known from DE 39 20 418 A1. According to this known method, a carrier part is initially manufactured which comprises a collar-like peripheral web on one of its ends. Depressions are formed in the circumferential surfaces of the web, wherein the casting material of the friction ring penetrates into said depressions during its subsequent casting. A reliable positive connection between the friction ring and the carrier element of the brake disk can also be produced in this fashion.

In all previously discussed methods for manufacturing brake disks with a carrier part and a friction ring that are cast in separate production steps, the material of the respective element being cast on flows into recesses of the other element. Although this makes it possible to easily and reliably produce the positive connection between the friction ring and the carrier part, it is difficult to optimize the shape of the projections necessary for the positive connection with respect to their requirements.

SUMMARY OF THE INVENTION

Based on the above-described state of the art, the invention aims to develop a method for manufacturing brake disks which makes it possible to manufacture brake disks with a cast carrier part and a separately cast friction ring being cast at different times, which are optimized further with respect to their function. The invention also aims to disclose a core moulding tool especially suitable for carrying out the method according to the invention.

According to a first variant of the invention, this objective is attained with a method for manufacturing a brake disk with a carrier part and a friction ring which comprises the following steps:
  producing the carrier part with at least one radially protruding projection arranged on its circumference,
  moulding a casting core that consists of core sand and surrounds the projection over a base section assigned to the carrier part onto the carrier part, while simultaneously sealing a free end section of the projection in such a way that this end section is not wetted by the sand of the casting core,
  casting the friction ring onto the carrier part provided with the casting core while casting in the free end section of the projection.

An alternative solution for the problem described above consists of a method for manufacturing a brake disk with a carrier part and a friction ring which comprises the following steps:
  producing the friction ring with at least one radially protruding projection arranged on its inner surface,
  moulding a casting core that consists of core sand and surrounds the projection over a base section assigned to the friction ring onto the friction ring, while sealing a free end section of the projection in such a way that this end section is not wetted by the sand of casting core,
  casting the carrier part onto the friction ring provided with the casting core while casting in the free end section of the projection.

In contrast to the state of the art, according to the invention in a first step either a carrier part provided with projections on its circumferential surface is prefabricated or a friction ring is first produced, on the inner circumferential surface of which corresponding projections are arranged radially protrudingly. By then moulding the casting core onto the respective prefabricated element, a core element that is used in a sand casting mould as in the conventional casting with casting cores is available for the ensuing production step of casting-on the respective other part. Complicated tools or preparation steps for manufacturing the mould required for casting-on the second element consequently can be eliminated. Instead the respective prefabricated element (carrier part or friction ring) with the core moulded thereon essentially defines the final shape of the respective element being cast-on. This makes it possible to inexpensively manufacture brake disks of the discussed type with a high precision and in large quantities.

Another advantage of the method according to the invention can be seen in the fact that the shape of the projections can be easily adapted to the loads occurring in practical applications. In contrast to the state of the art, in which the material of the respective element being cast on flows into the pockets of the respective prefabricated element, it is possible to produce, if so required, more complex shape elements of the projections, e.g., small radii, roundings or undercuts with a high dimensional accuracy during the course of the prefabrication process. This cannot be achieved when casting material into pocket-like recesses of the respective prefabricated element.

Consequently, the invention makes it possible to manufacture brake disks, in which the friction ring and the carrier part can be easily positively connected to one another in such a way that the ring is able to freely expand in the radial direction when heated. This reduces the risk of the formation of stress cracks in the friction ring to a minimum. The thusly achieved long service life of brake disks manufactured in accordance with the invention makes it possible to realize the carrier part in the form of a hub that is directly supported on an axle by means of a maintenance-free bearing. Since the service life of the brake disk is at least as long as that of the bearing, with sudanarrangement it is not required to remove the brake disk during the service life of the bearing such that the optimal position of the bearing defined during its installation does not have to be changed despite the brake disk being directly connected thereto.

One essential aspect of the method according to the invention is that when the casting core is "connected" to the prefabricated element (carrier part or friction ring)the end section of the prefabricated element, onto which the other element of the brake disk, is subsequently cast, is sealed in such a way that it is reliably shielded from core sand. This measure is essential for ensuring on the one hand that the friction ring, is able to expand radially in an unobstructed fashion. In addition, this prevents any corrosion and premature abrasive wear in the region of the connection between the carrier part and the friction ring.

The respective prefabricated element is preferably also of a cast part. Since no integral connection between the materials is produced when casting material is cast onto a prefabricated cast part, a purely positive connection between the two parts connected can be produced easily in this fashion.

The projection may be sealed by placing a sealing element onto the projection before moulding-on the casting core, wherein said sealing element shields the surface of the end section from the core sand of the casting core. This sealing element may, for example, be adapted to the shape of the end section to be sealed in such a way that it completely surrounds the projection in a sealing position. The sealing element is advantageously realized in a divided fashion such that it can be easily detached after the casting core is moulded-on. In this context, it is also practical if the sealing element forms part of the core moulding tool. Due to this measure, the sealing element and its components can be detached from the carrier part with opening of the mould.

It is also preferred that the sealing element consists of an elastic material. When utilizing such an elastic material, it is, in particular, easily possible to accomplish the sealing of the free end section of the projection under the influence of a compressive force acting upon the sealing element. The end section can be sealed more securely if the sealing element is attached under the influence of such a compressive force.

In order to achieve a particularly reliable connection between the friction ring and the carrier part, it is advantageous if the carrier part contains radially protruding projections, uniformly distributed over its circumference. Due to the larger number and the uniform arrangement of these projections, the forces generated during a braking maneuver can be more easily taken up by the carrier part. This also applies when a carrier part is cast onto a friction ring with projections, of the friction ring has radially protruding projections that are uniformly distributed over its inner surface.

A clean termination of a casting core that only extends over part of the axially measured length of the carrier part can be achieved by moulding-on the casting core while sealing the section of the carrier part not to be wetted by the sand of the casting core.

With respect to the moulding tool, the above-mentioned objective is attained with a core moulding tool that is equipped with a bottom box and a top box, wherein the attached top box and bottom box form a hollow mould for the casting core to be moulded in the closed position. According to the invention, such a core moulding tool is characterized in that a receptacle for a carrier part of a brake disk which contains a radially protruding projection on its circumferential surface is formed in the hollow mould, in that a space that can be filled with sand is at least sectionally formed between the carrier part and the outer wall of the hollow mould when the carrier part is situated in the hollow mould, in that a recess originating from the hollow mould is provided which receives the free end section of the projection of the carrier part when the carrier part is situated in the hollow mould, and in that a seal is arranged in the region of the recess which, in the closed position of the top box and the bottom box, seals the end section protruding into the receptacle relative to the space of the hollow mould to be filled with core sand. Such a moulding tool makes it possible to inexpensively mould large quantities of casting cores onto prefabricated components of brake disks, wherein it is ensured that the section of the projection which needs to remain accessible for the subsequent casting process is protected from being wetted by the core sand.

In this case, the sealing element may be realized in the form of an insert that is inserted into the receptacle, wherein said insert is adapted to the shape of and completely covers the end section. The plane of partition between the top box and the bottom box is preferably positioned such that one section of the recess is arranged in the top box and the other section of the recess is arranged in the bottom box. This is particularly advantageous when using a divided sealing element, wherein one half of the sealing element can be arranged in the section assigned to the top box and its other half can be arranged in the section of the recess assigned to the bottom box.

A clean termination in the longitudinal direction of the casting core can be easily achieved by providing a seal that can be tangentially placed against the circumference of the carrier part and separates a partial section of the hollow space from the space to be filled with sand.

The seals used in the tool according to the invention may also be carried by sliding elements that can be moved in the direction of the hollow mould. This applies, in particular, to the sealing element that can be tangentially placed against the circumference of the carrier part. The sealing elements used for sealing the projection as well as the sealing elements for sealing a section of the carrier part may be realized in a tubular fashion such that they can be expanded if pressure is applied to their interior. Alternatively or additionally, the respective sealing elements may also be formed by sealing lips carried by the top box and/or the bottom box.

One particularly practical embodiment of a moulding tool according to the invention is characterized in that the receptacle is realized in the form of a shoulder that is integrally formed onto the bottom of the bottom box or the top box and centers the carrier part seated thereon in the hollow mould. Due to this measure, the effort associated with aligning the prefabricated part in the mould box is reduced to a minimum.

BRIEF DESCRIPTION OF THE DRAWINGS

One embodiment of the invention is described in greater detail below with reference to a drawing. The figures schematically show.

DETAILED DESCRIPTION OF THE INVENTION

Figure 1A:
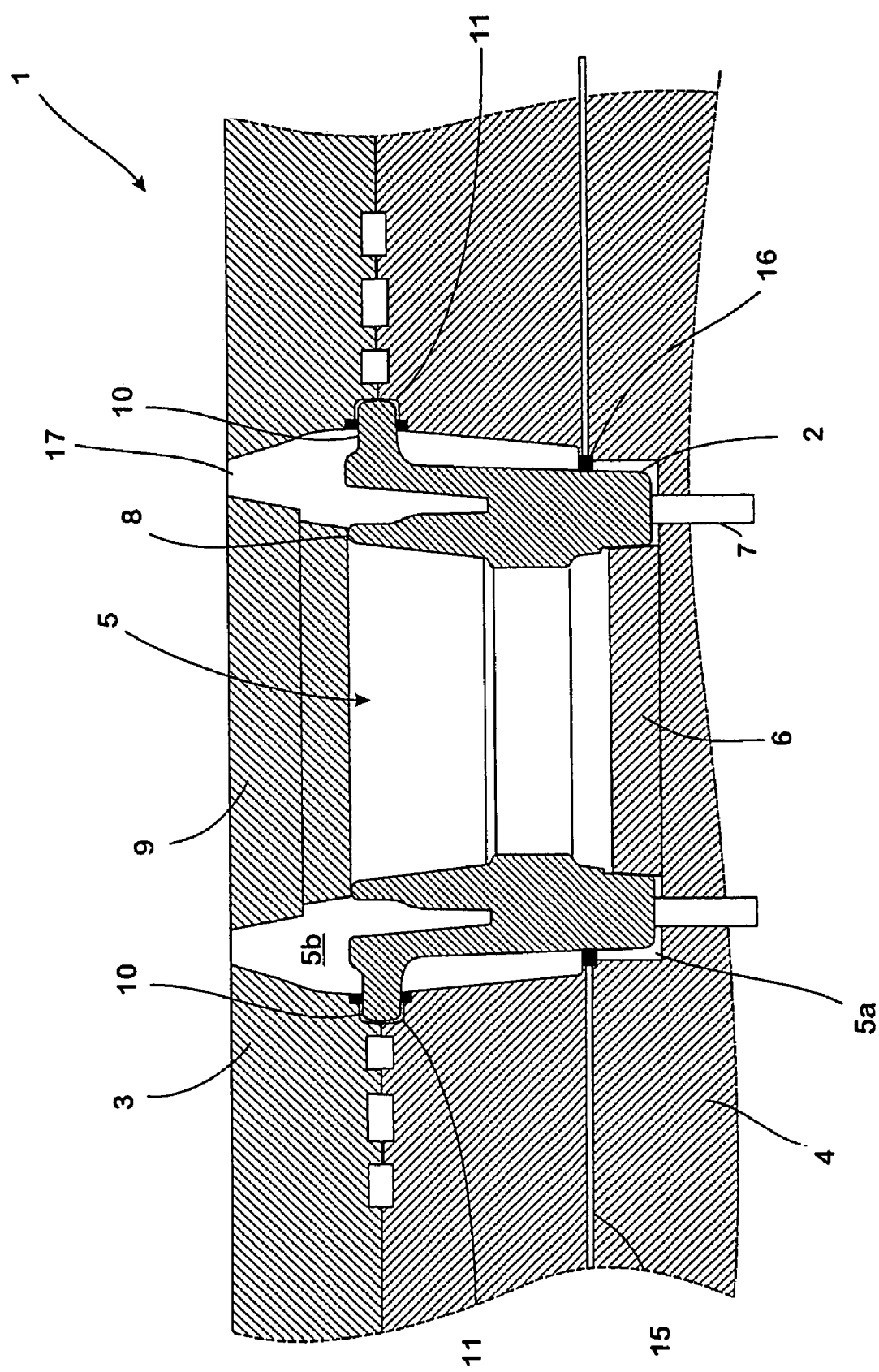
FIG. 1a, a section of a core moulding tool in a first operating position, a longitudinal section.

A prefabricated carrier part 2 is inserted into the core moulding tool 1 that is illustrated in the closed position in FIG. 1, wherein said carrier part forms the hub or the pot of a brake disk to be manufactured.

In this case, the core moulding tool comprises a top box 3 and a bottom box 4 that collectively surround a hollow space 5. A receptacle 6 in the form of a shoulder that has the shape of a truncated cone is centrally arranged on the bottom of the hollow space 5 which is formed by one wall of the bottom box 4, wherein the carrier part 2 is placed onto said shoulder. The outside diameter and the shape of the receptacle 6 are adapted to the inside diameter and the shape of the inner region of the carrier part 2, into which the receptacle 6 engages. Due to this measure, the, carrier part 2 is centered in the hollow space 5 by the receptacle 6.

The carrier part 2 is seated on ejectors 7 arranged around the receptacle 6 within regular intervals with its edge that is assigned to the bottom of the bottom box. A cover 9 also lies on the edge 8 of the end face of the carrier part 2 which edge is assigned to the top box 3, wherein said cover widens in the shape of a cone starting from the aforementioned edge such that the interior of the carrier part 2 is completely sealed relative to its surrounding.

Projections 10 are integrally formed onto the essentially cylindrical outer wall of the carrier part near the upper edge 8, namely such that they are uniformly distributed over the circumference. Each projection 10 engages into a recess 11 that, starting from the hollow space 5 and the plane of partition T between the top box 3 and the bottom box 4 is realized such that its upper section 11a lies in the top box 3 and its lower section 11b lies in the bottom box 4. One respective sealing element 12a, 12b is inserted into the upper section 11a and the lower section 11b of the recess 11, wherein the surface of the sealing element which is assigned to the respective projection 10 is adapted to the shape of said projection 10. On its end that is assigned to the hollow space 5, the sealing elements 12a, 12b additionally carry a bead 13a, 13b of annular cross section which tightly adjoins to the assigned surfaces of the respective projections 10.

The sealing elements 12a, 12b and their beads 13a and 13b, respectively consist of an elastic material. Their wall thickness is oversized referred to the shape of the recesses 11 and the space remaining therein when the projections 10 engage into the recesses 11 such that the sealing elements 12a, 12b and, in particular, their respective bead 13a, 13b are pressed against the assigned projection 10 under pressure in the closed position of the core moulding tool 1. This means that the base section 10a assigned to the carrier part 2 is securely sealed relative to the free end section 10b that extends up to the end of the projections 10.

As an alternative to the utilization of elastic sealing elements 12a, 12b, not-shown sealing lips may be provided in the region of the transition between the recesses 11 and the hollow space 5. In this case, sealing elements assigned to the bottom box may, for example, be mounted on horizontally or vertically movable sliders. It would also be conceivable to utilize not-shown tubular sealing elements that expand when their interior is subjected to pressure in order to seal the respective end section 10b relative to the corresponding base section 10a.

Beginning at the plane of partition T and the hollow space 5, the upper section of a mould for the part 14a of the casting core to be moulded onto the carrier element 2 is additionally realized in the top box 3, wherein said part of the casting core has the shape of an annular disk and is arranged perpendicular to the longitudinal axis of the carrier element 2.

The lower section of the mould is correspondingly arranged in the bottom box 4. The ventilation channels of the friction ring are constituted by the disk-shaped part of the casting core 14 when the friction ring is cast onto the carrier part 2.

A region 5a of the hollow space 5 which is assigned to the bottom of the bottom box 4 is sealed relative to the region 5b of the hollow space 5, in which the annular part 14b of the casting core 14 is moulded, by means of a seal 16 that is mounted on a slide 15 and pressed against the circumferential surface of the carrier part 2. Core sand can be injected into the region 5b of the hollow space 5 and the mould for the annular disk-shaped part 14a which is connected thereto via openings 17 in the top box 3.

Figure 1B:
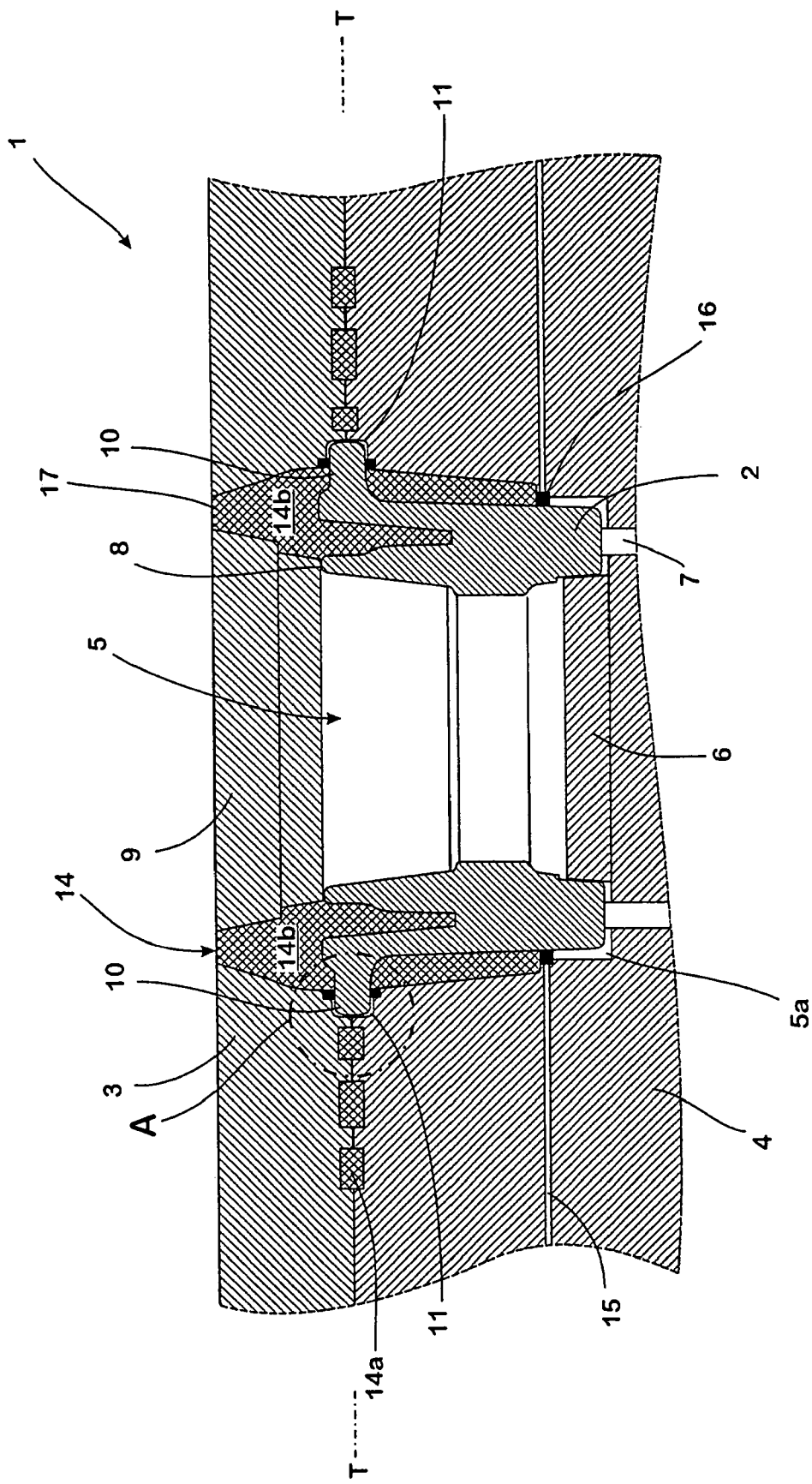
FIG. 1b, a representation according to FIG. 1 of the core moulding tool in a second operating position.
Figure 2:
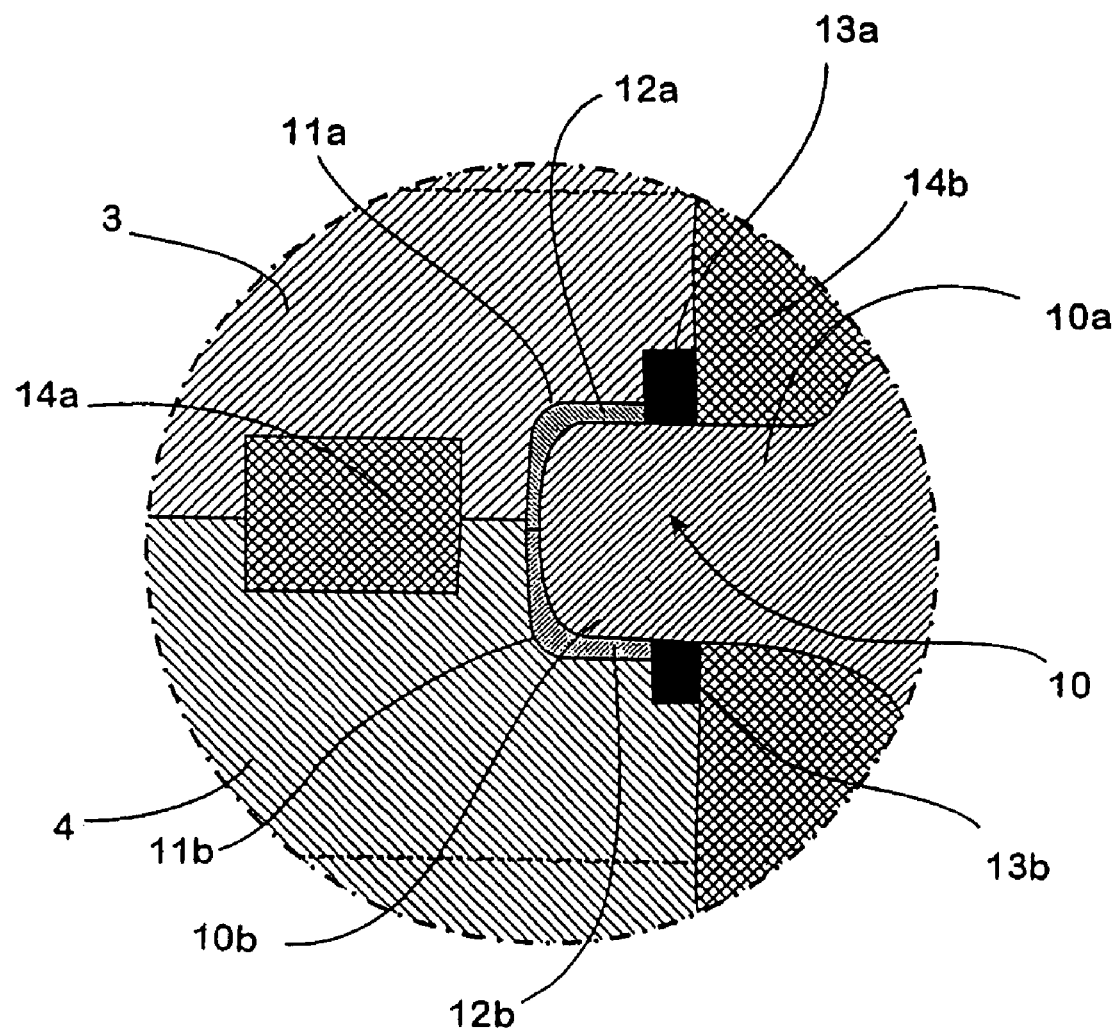
FIG. 2, an enlarged representation of a detail "A" in FIG. 1b.
Figure 3:
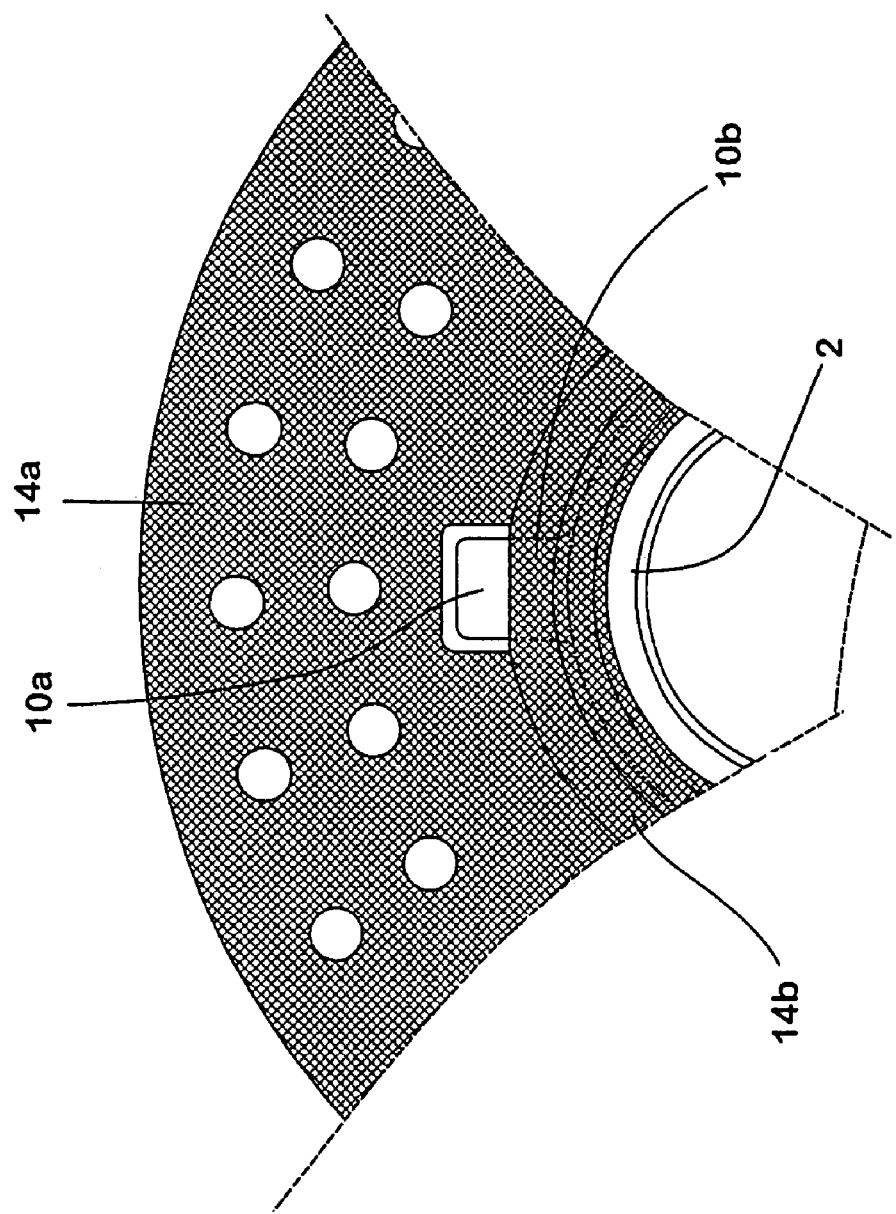
FIG. 3, a section of a carrier part Kith the casting core moulded thereon, in the form of a top view.
Figure 4A:
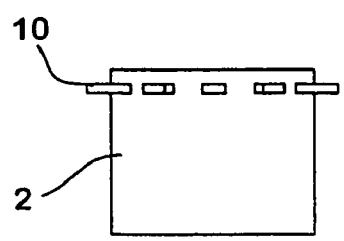
FIGS. 4a–4d, respective side views of the carrier part during the various production steps carried out when manufacturing a brake disk, FIG. 4a', a top view of the carrier part.
Figure 4A:
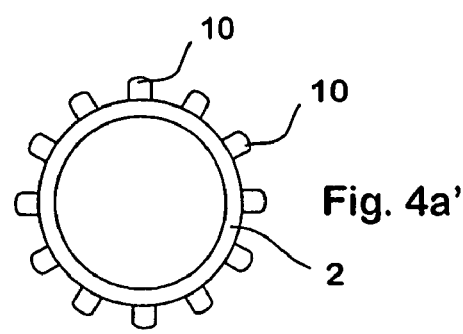
Figure 4B:
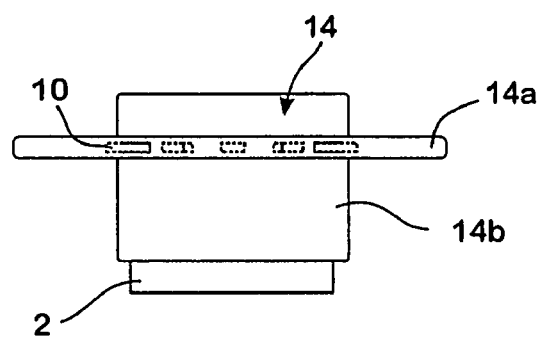

In order to manufacture a brake disk B, the carrier part 2 with the radially protruding finger-like projections 10 moulded thereon is initially cast in a not-shown greensand casting mould (FIG. 4a). Subsequently, the prefabricated carrier part 2 is inserted into the core moulding device 1 (FIG. 1a) and the casting core 14 is moulded onto the carrier part by injecting core sand into the accessible regions of the hollow mould 5 of the core moulding device 1 (FIG. 1b, FIG. 4b). During this process, the sealing elements 12a, 12b and their respective bead 13a, 13b ensure that the end section 10b of the projections 10 remain free from core sand. When the core moulding tool 1 is opened, the sealing elements 12a, 12b with the respective beads 13a, 13b which are connected to the top box and the bottom box are lifted off the end sections 10b of the projections 10 such that these are exposed for casting on the friction ring R.

The carrier part 2 with the casting core 14 moulded thereon is subsequently inserted into a not-shown greensand casting mould, and the friction ring R is cast onto the carrier part 2. The casting mould merely needs to contain the hollow mould for the friction ring and the seat for the carrier part 2 with the casting core 14.

Figure 4C:
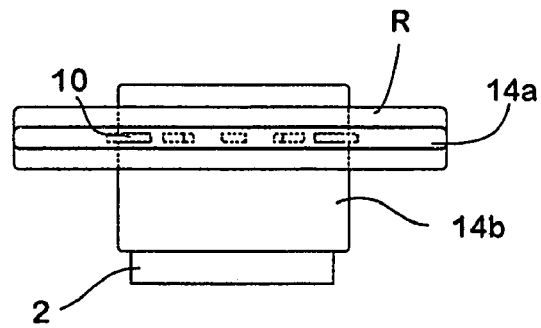
Figure 4D:
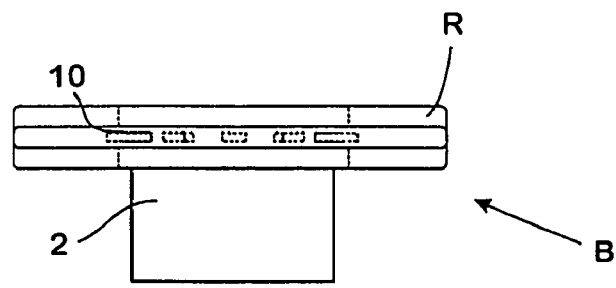

During the casting of the-friction ring R, the casting material flows around the free end sections 10b of the projections 10 which are not covered by the sand, namely without producing an integral connection with the castin material of the carrier part 2. After the friction ring R has solidified, the projections 10 of the carrier part engage into pockets of the friction ring R which are exactly adapted to their shape. A reliable positive connection that allows a radial expansion can this be produced between the friction ring R and the carrier part 2 (FIG. 4c). The brake disk B is finished after the friction disk R has solidified and the casting core 14 has been removed.

LIST OF REFERENCE SYMBOLS

| | |
|---|---|
| 1 | Core moulding tool |
| 2 | Carrier part |
| 3 | Top box |
| 4 | Bottom box |
| 5 | Hollow space |
| 5a | Region of the hollow space 5 which is assigned to the bottom of the bottom box 4 |
| 5b | Region of the hollow space 5, in which the annular part 14b of the casting core 14 is moulded |
| 6 | Receptacle |
| 7 | Ejector |
| 8 | Edge of the carrier part 2 |
| 9 | Cover |
| 10 | Projections |
| 10a | Base section of the projections |
| 10b | End section of the projections |
| 11 | Recess |
| 11a | Upper section of the recess 11 |
| 11b | Lower section of the recess 11 |
| 12a, 12b | Sealing elements |
| 13a, 13b | Bead |
| 14 | Casting core |
| 14a | Disk-shaped part of the casting core 14 |
| 14b | Annular part of the casting core 14 |
| 15 | Slider |
| 16 | Seal |
| 17 | Openings in the top box 3 |
| B | Brake disk |
| R | Friction disk |
| T | Plane of partition |

The invention claimed is:

1. A method for manufacturing a brake disk comprising a carrier part and a friction ring, comprising the following production steps:
   producing a first component of the brake disk consisting of the carrier part or the friction ring with at least one radially protruding projection arranged on its circumference, by means of casting,
   moulding a casting core that consists of core sand and surrounds the projection over a base section assigned to the first component onto the first component while sealing a free end section of the projection in such a way that this end section is not wetted by the sand of the casting core,
   casting a second component of the brake disk consisting of the other of the carrier part or the friction ring onto the first component provided with the casting core while casting in the free end section of the projection.

2. The method according to claim 1, wherein a sealing element is attached to the projection before the casting core is moulded on, wherein said sealing element shields the surface of the end section from the core sand of the casting core.

3. The method according to claim 2, wherein the sealing element completely surrounds the end section of the projection in the sealing position.

4. The method according to claim 2, wherein the sealing element consists of an elastic material.

5. The method according to claim 2, wherein the free end section of the projection is sealed under the influence of a compressive force that acts upon the sealing element.

6. The method according to claim 1 wherein the first component is the carrier part and the second component is the friction ring.

7. The method according to claim 1 where the first component is the friction ring and the second component is the carrier part.

8. The method according to claim 6, wherein the carrier part is provided with projections radially protruding from it circumference, which are uniformly distributed over its circumference.

9. The method according to claim 7, wherein the friction ring is provided with projections radially protruding from its inner surface, which are uniformly distributed over its inner surface.

10. The method according to claim 1, wherein the casting core only extends over part of the axially measured length of the carrier part and in that the casting core is moulded on while sealing the section of the carrier part not to be wetted by the sand of the casting core.

* * * * *